(12) United States Patent
Weng et al.

(10) Patent No.: US 6,197,910 B1
(45) Date of Patent: Mar. 6, 2001

(54) PROPYLENE POLYMERS INCORPORATING MACROMERS

(75) Inventors: Weiqing Weng, Houston; Armen Dekmezian; Eric J. Markel, both of Kingwood; Avinash Gadkari; David L. Peters, both of Houston, all of TX (US)

(73) Assignee: Exxon Chemical Patents, Inc., Baytown, TX (US)

( * ) Notice: Subject to any disclaimer, the term of this patent is extended or adjusted under 35 U.S.C. 154(b) by 0 days.

(21) Appl. No.: 09/020,306

(22) Filed: Feb. 6, 1998

Related U.S. Application Data
(60) Provisional application No. 60/069,189, filed on Dec. 10, 1997.

(51) Int. Cl.[7] .................................................. C08F 110/06
(52) U.S. Cl. ......................... 526/351; 526/348; 526/943
(58) Field of Search ........................... 525/53, 240, 247, 525/270, 322; 526/351, 65

(56) References Cited

U.S. PATENT DOCUMENTS

| | | | |
|---|---|---|---|
| 4,335,225 | 6/1982 | Collette et al. ........................ | 525/240 |
| 4,530,914 | 7/1985 | Ewen et al. ........................... | 502/113 |
| 4,542,199 | 9/1985 | Kaminsky et al. .................... | 526/160 |
| 4,543,399 | 9/1985 | Jenkins III, et al. .................. | 526/70 |
| 4,588,790 | 5/1986 | Jenkins III, et al. .................. | 526/70 |
| 4,665,208 | 5/1987 | Welborn, Jr. et al. ................. | 556/179 |
| 4,701,432 | 10/1987 | Welborn, Jr. .......................... | 502/113 |
| 4,808,561 | 2/1989 | Welborn, Jr. .......................... | 502/104 |
| 4,871,705 | 10/1989 | Hoel ..................................... | 502/117 |
| 4,874,734 | 10/1989 | Kioka et al. .......................... | 502/104 |
| 4,892,851 | 1/1990 | Ewen et al. ........................... | 502/104 |
| 4,908,463 | 3/1990 | Bottelberghe ......................... | 556/179 |
| 4,916,198 | 4/1990 | Scheve et al. . | |
| 4,921,825 | 5/1990 | Kioka et al. .......................... | 502/104 |
| 4,923,833 | 5/1990 | Kioka et al. .............................. | 502/9 |
| 4,924,018 | 5/1990 | Bottelberghe ......................... | 556/179 |
| 4,933,403 | 6/1990 | Kaminsky et al. .................... | 526/160 |
| 4,937,299 | 6/1990 | Ewen et al. ........................... | 526/119 |
| 4,952,540 | 8/1990 | Kioka et al. .............................. | 502/9 |
| 4,968,827 | 11/1990 | Davis ................................... | 556/179 |
| 5,017,714 | 5/1991 | Welborn, Jr. .......................... | 556/12 |
| 5,026,789 | 6/1991 | Canich ................................. | 526/127 |
| 5,028,670 | 7/1991 | Chinh et al. .......................... | 526/73 |
| 5,057,475 | 10/1991 | Canich et al. ......................... | 502/104 |
| 5,091,352 | 2/1992 | Kioka et al. .......................... | 502/103 |
| 5,103,031 | 4/1992 | Smith, Jr. ............................. | 556/179 |
| 5,120,867 | 6/1992 | Welborn, Jr. .......................... | 556/12 |
| 5,132,381 | 7/1992 | Winter et al. ......................... | 526/160 |
| 5,155,080 | 10/1992 | Elder et al. ........................... | 502/152 |
| 5,157,137 | 10/1992 | Sangokoya ........................... | 556/179 |
| 5,198,401 | 3/1993 | Turner et al. ......................... | 502/155 |
| 5,204,419 | 4/1993 | Tsutsui et al. ........................ | 526/153 |
| 5,206,199 | 4/1993 | Kioka et al. .......................... | 502/117 |
| 5,235,081 | 8/1993 | Sangokoya ........................... | 556/179 |
| 5,239,022 | 8/1993 | Winter et al. ......................... | 526/127 |

(List continued on next page.)

FOREIGN PATENT DOCUMENTS

| | | |
|---|---|---|
| 0 190 889 B1 | 8/1986 | (EP) . |
| 190889 | * 8/1986 | (EP) . |
| 0 277 003 A1 | 8/1988 | (EP) . |
| 0 277 004 A1 | 8/1988 | (EP) . |
| 0 279 586 B1 | 8/1988 | (EP) . |
| 0 279 863 B1 | 8/1988 | (EP) . |
| 0 320 762 B1 | 6/1989 | (EP) . |
| 0 354 893 B1 | 2/1990 | (EP) . |
| 0 366 411 A2 | 5/1990 | (EP) . |
| 0 426 637 A2 | 5/1991 | (EP) . |
| 0 495 375 A2 | 7/1992 | (EP) . |
| 0 500 944 A1 | 9/1992 | (EP) . |
| 0 520 732 A1 | 12/1992 | (EP) . |

(List continued on next page.)

OTHER PUBLICATIONS

"Structures and Properties of Block Polymers and Multiphase Polymer Systems: An overview of Present Status and Future Potential", S.L. Aggarwal, Sicth Biennial Manchester Polymer Symposium (UMIST Manchester, Mar. 1976).

"Properties of Isotactic, Atactic, and Stereoblock Homopolymers, Random and Block Copolymers of α–Olefins", G. Natta, Journal of Polymer Science, vol. 34, pp. 531–549,(1959).

"Thermoplastic Elastomer Categories: A comparison of physical properties", N.R. Legge, Elastomerics, vol. 123–No.8, pp. 14–20 (Aug. 1991).

*Experimental Methods in Catalyst Research*, Vol. 1, Academic Press, 1968, pp. 67–96.

(List continued on next page.)

*Primary Examiner*—David W. Wu
*Assistant Examiner*—Caixia Lu-Rutt
(74) *Attorney, Agent, or Firm*—Brent M. Peebles; David J. Alexander; Paige Schmidt

(57) ABSTRACT

A polyolefin composition is provided which consists essentially of isotactic polypropylene and, optionally, repeating units of one or more comonomers, wherein the total comonomer repeating unit content of the polyolefin composition is from 0 to 20 mole percent, and further, wherein the weight average branching index g' for the lower molecular weight region of the polyolefin composition is less than 0.93. Additionally, a process is provided for producing a polyolefin composition comprising:

a) contacting, in solution, at a temperature from about 90° C. to about 120° C., propylene monomers with a catalyst composition comprising a first chiral, stereo-origid transition metal catalyst compound capable of producing isotactic polypropylene;

b) copolymerizing the product of a) with propylene and, optionally, one or more copolymerizable monomers, in a polymerization reactor under suitable polypropylene polymerization conditions using a second chiral, stereo-origid transition metal catalyst capable of producing isotactic polypropylene; and c) recovering a branched olefin polymer.

16 Claims, 4 Drawing Sheets

U.S. PATENT DOCUMENTS

| | | |
|---|---|---|
| 5,240,894 | 8/1993 | Burkhardt et al. .................... 502/108 |
| 5,243,001 | 9/1993 | Winter et al. .......................... 526/127 |
| 5,248,801 | 9/1993 | Sangokoya ............................ 556/179 |
| 5,276,208 | 1/1994 | Winter et al. ............................ 556/53 |
| 5,278,119 | 1/1994 | Turner et al. ......................... 502/155 |
| 5,278,264 | 1/1994 | Spaleck et al. ....................... 526/127 |
| 5,296,434 | 3/1994 | Karl et al. ............................. 502/117 |
| 5,304,614 | 4/1994 | Winter et al. .......................... 526/127 |
| 5,308,815 | 5/1994 | Sangokoya ............................ 502/104 |
| 5,318,935 | 6/1994 | Canich et al. ........................ 502/117 |
| 5,324,800 | 6/1994 | Welborn, Jr. et al. ............... 526/160 |
| 5,329,032 | 7/1994 | Tran et al. ............................ 556/179 |
| 5,352,749 | 10/1994 | DeChellis et al. ..................... 526/68 |
| 5,391,629 | 2/1995 | Turner et al. ......................... 525/268 |
| 5,391,790 | 2/1995 | Rohrmann et al. ..................... 556/28 |
| 5,405,922 | 4/1995 | DeChellis et al. ..................... 526/68 |
| 5,436,304 | 7/1995 | Griffin et al. .......................... 526/68 |
| 5,504,169 | 4/1996 | Canich .................................. 526/127 |
| 5,504,171 * | 4/1996 | Etherton et al. ..................... 526/336 |
| 5,510,502 | 4/1996 | Sugano et al. .......................... 556/11 |
| 5,514,761 | 5/1996 | Etherton et al. ..................... 526/144 |
| 5,516,848 | 5/1996 | Canich et al. . | |
| 5,539,056 | 7/1996 | Yang et al. ............................ 525/240 |
| 5,541,236 | 7/1996 | DeNicola, Jr. et al. ............. 522/157 |
| 5,554,668 | 9/1996 | Scheve et al. . | |
| 5,589,549 * | 12/1996 | Govoni et al. ........................ 525/247 |
| 5,591,785 | 1/1997 | Scheve et al. . | |
| 5,643,847 | 7/1997 | Walzer, Jr. ............................ 502/117 |
| 5,747,160 * | 5/1998 | Pinoca et al. ......................... 428/364 |

FOREIGN PATENT DOCUMENTS

| | | |
|---|---|---|
| 0 573 403 | 8/1993 | (EP) . |
| 0 561 476 A1 | 9/1993 | (EP) . |
| 0 570 982 A1 | 11/1993 | (EP) . |
| 0 573 403 A2 | 12/1993 | (EP) . |
| 0 577 581 A2 | 1/1994 | (EP) . |
| 0 578 838 A1 | 1/1994 | (EP) . |
| 0 594 218 A1 | 4/1994 | (EP) . |
| 0 384 431 B1 | 11/1994 | (EP) . |
| 384431 * | 11/1994 | (EP) . |
| H4-337308 | 1/1992 | (JP) . |
| WO 91/09882 | 7/1991 | (WO) . |
| WO 92/00333 | 1/1992 | (WO) . |
| WO 93/19103 | 9/1993 | (WO) . |
| WO 94/07930 * | 4/1994 | (WO) . |
| WO 95/11931 * | 4/1994 | (WO) . |
| WO 94/07928 A1 | 4/1994 | (WO) . |
| WO 94/03506 | 5/1994 | (WO) . |
| WO 94/10180 | 5/1994 | (WO) . |
| WO 94/28034 | 12/1994 | (WO) . |
| WO 95/25757 | 9/1995 | (WO) . |
| WO 96/00243 | 1/1996 | (WO) . |
| WO 96/23010 | 1/1996 | (WO) . |
| WO 96/04319 | 2/1996 | (WO) . |
| WO 96/00245 | 4/1996 | (WO) . |
| WO 96/23838 A1 | 8/1996 | (WO) . |
| WO 97/43321 A1 | 11/1997 | (WO) . |
| WO 98/34970 | 8/1998 | (WO) . |

OTHER PUBLICATIONS

Journal of Organometallic Chemistry, vol. 228, pp. 63–67 (1958).

"The Influence of Aromatic Substituents on the Polymerization Behavior of Bridged Zirconocene Catalysts", W. Spaleck, et al., Organometallics, 1994, 13, 954–963.

"ansa–Zirconocene Polymerization Catalysts with Annelated Ring Ligands–Effects on Catalytic Activity and Polymer Chain Lengths", H. Brinzinger, et al., Organometallics 1994, 13, 964–970.

J. Chem. Phys., B.H. Zimm and W.H. Stockmayer, 17, 1301 (1949).

Bivariate chain length and long chain branching distribution for copolymerization of olefins and polyolefin chains containing terminal double–bonds, Macromol. Theory Simul. 5, 547–572 (1996).

Semicrystalline Polyolefins—Narrow MWD and Long Chain Branching: Best of Both Worlds, Antec, pp. 2334–2337, 1996.

Cationic Metallocene Polymerization Catalysts Based on Tetrakis (pentafluorophenyl)borate and Its Derivatives. Probing the Limits of Anion "Noncoordination" via a Synthetic, Solution Dynamic, Structural, and Catalytic Olefin Polymerization Study, Jia, et al., Organometallics, 1997, 16, 842–857.

* cited by examiner

PROPYLENE POLYMERS INCORPORATING MACROMERS

This application is based on U.S. provisional application 60/069,189, filed Dec. 10, 1997.

FIELD OF THE INVENTION

The present invention relates to propylene polymers incorporating macromers and a method for the preparation of branched polypropylene utilizing chiral, stereorigid transition metal catalyst compounds.

BACKGROUND OF THE INVENTION

Polypropylene and related polymers are known to have low melt strength. This is a significant deficiency in key application areas such as thermoforming and blow molding. Polyethylene on the other hand is used extensively in blown film applications requiring good melt strength. The limitations in the melt strength of polypropylenes show up as excess sag in sheet extrusion, rapid thinning of walls in parts thermoformed in the melt phase, low draw-down ratios in extrusion coating, poor bubble formation in extrusion foam materials, and relative weakness in large-part blow molding. Thus, it would be highly desirable to produce polypropylene and related polymers having enhanced melt strength as well as commercially valuable processability.

Increasing the melt strength of polymers such as polypropylene has been an industrial goal for well over ten years, however, success has been limited. The desirable properties that have made low density polyethylene commercially successful are attributed in large part to high melt strength and excellent processability. Both of these properties are attributed to the presence of long chain branching which is thought to occur under high pressure polymerization conditions.

There has been some success in increasing the melt strength of polypropylene. For example, EP 190 889 A2 discloses high energy irradiation of polypropylene to create what is believed to be polypropylene having substantial free-end long branches of propylene units. EP 384 431 discloses the use of peroxide decomposition of polypropylene in the substantial absence of oxygen to obtain a similar product.

Other attempts to improve the melt properties of polypropylene include U.S. Pat. No. 5,541,236, which introduces long chain branching by bridging two PP backbones to form H-type polymers, and U.S. Pat. No. 5,514,761, which uses dienes incorporated in the backbones to achieve a similar effect. However, it is difficult to avoid cross-linking and gel formation in such processes.

Thus, there is still a need for propylene polymers having improved melt strength and good processability.

SUMMARY OF THE INVENTION

The present invention meets that need by providing a polyolefin composition consisting essentially of isotactic polypropylene and, optionally, repeating units of one or more comonomers, wherein the total comonomer repeating unit content of the polyolefin composition is from 0 to 20 mole percent, and further, wherein the weight average branching index g' for the lower molecular weight region of the polyolefin composition is less than 0.93. Additionally, a process is provided for producing a polyolefin composition comprising:

a) contacting, in solution, at a temperature from about 90° C. to about 120° C., propylene monomers with a catalyst composition comprising a first chiral, stereorigid transition metal catalyst compound capable of producing isotactic polypropylene;

b) copolymerizing the product of a) with propylene and, optionally, one or more copolymerizable monomers, in a polymerization reactor under suitable polypropylene polymerization conditions using a second chiral, stereorigid transition metal catalyst capable of producing isotactic polypropylene; and c) recovering a branched olefin polymer.

DETAILED DESCRIPTION OF THE INVENTION

Figure 1:
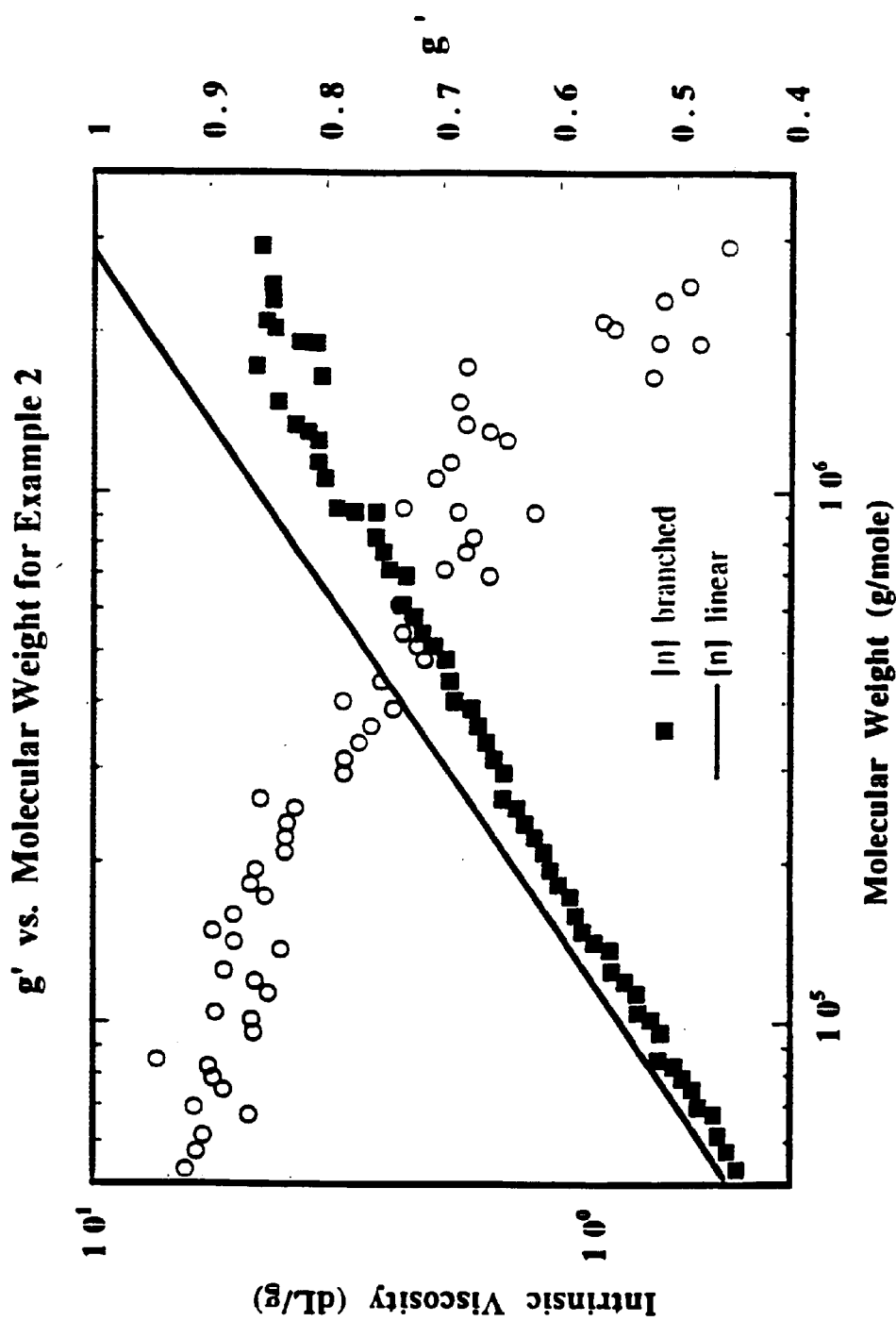
FIG. 1 is a graphic illustration of the relationship between the weight average branching index g' and the molecular weight for the polymer product produced in Example 2.

The polyolefin compositions of this invention are comprised of branched polymers wherein both the polymer backbone and polymeric sidechains are derived from propylene polymerized under coordination or insertion conditions with activated transition metal organometallic catalyst compounds. The sidechains are stereospecific (either isotactic or syndiotactic) polypropylene which exhibit crystalline, semi-crystalline or glassy properties suitable for hard phase domains in accordance with the art understood meaning of those terms, and are attached to a polymeric backbone that is also crystalline. The backbone is composed of stereospecific polypropylene and, optionally, one or more comonomers. Preferably, the backbone and the sidechains are isotactic polypropylene. These compositions are useful as thermoforming resins and exhibit improved processability over current polypropylene compositions.

The Macromer Sidechains

The sidechains are polypropylene macromers, which can be prepared under solution polymerization conditions with metallocene catalysts suitable for preparing either of isotactic or syndiotactic polypropylene. A preferred reaction process for propylene macromers having high levels of terminal vinyl unsaturation is described in co-pending U.S. application Ser. No. 60/067,783 filed Dec. 10, 1997. Typically used catalysts are stereorigid, chiral or asymmetric, bridged metallocenes. See, for example, U.S. Pat. No. 4,892,851, U.S. Pat. No. 5,017,714, U.S. Pat. No. 5,132,281, U.S. Pat. No. 5,132,381, U.S. Pat. No. 5,155,080, U.S. Pat. No. 5,296,434, U.S. Pat. No. 5,278,264, U.S. Pat. No. 5,304,614, U.S. Pat. No. 5,510,502, WO-A-(PCT/US92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, *Organometallics* 1994, 13, 954–963, and "ansa-Zirconocene Polymerization Catalysts with Annelated Ring Ligands-Effects on Catalytic Activity and Polymer Chain Lengths", Brinzinger, H., et al, *Organometallics* 1994, 13, 964–970, and documents referred to therein.

Preferably, the stereorigid transition metal catalyst compound is selected from the group consisting of bridged bis(indenyl) zirconocenes or hafnocenes or azulenyl ligand equivalents thereof In a preferred embodiment, the transition metal catalyst compound is a dimethylsilyl-bridged bis (indenyl) zirconocene or hafnocene. More preferably, the transition metal catalyst compound is dimethylsilyl bis(2-methyl-4-phenylindenyl) zirconium or hafnium dichloride or dimethyl. In another preferred embodiment, the transition metal catalyst is a dimethylsilyl-bridged bis(indenyl) hafnocene such as dimethylsilyl bis(indenyl)hafnium dimethyl or dichloride. The method for preparing propylene-based macromers having a high percentage of vinyl terminal bonds involves:

a) contacting, in solution at a temperature from about 90° C. to about 120° C., propylene, optionally a minor amount of copolymerizable monomer, with a catalyst composition containing the stereorigid, activated transition metal catalyst compound; and b) recovering isotactic or syndiotactic polypropylene chains having number average molecular weights of about 2,000 to about 50,000 Daltons.

Preferably, the solution comprises a hydrocarbon solvent such as toluene. Also, the propylene monomers are preferably contacted at a temperature from 95° C. to 115° C. More preferably, a temperature from 100° C. to 110° C. is used. Most preferably, the propylene monomers are contacted at a temperature from 105° C. to 110° C. The pressures of the reaction generally can vary from atmospheric to 345 MPa, preferably to 182 MPa. The reactions can be run batchwise or continuously. Conditions for suitable slurry-type reactions will also be suitable and are similar to solution conditions, the polymerization typically being run in liquid propylene under pressures suitable to such.

Additionally the invention branched polyolefin composition can be prepared directly from the selected olefins concurrently in the presence of a mixed catalyst system comprising at least one first transition metal olefin polymerization catalyst capable of preparing propylene copolymers having greater than 50% chain end-group unsaturation and at least one second transition metal olefin polymerization catalyst capable of incorporating the propylene homopolymer or copolymer sidechains into said branched olefin copolymer. This in situ method can be practiced by any method that permits both preparation of isotactic polypropylene macromers having crystalline, semi-crystalline or glassy properties and copolymerization of the macromers with polypropylene and other comonomers such that a branched copolymer is prepared. Gas phase, slurry and solution processes can be used under conditions of temperature and pressure known to be useful in such processes.

As used herein, "isotactic polypropylene" is defined as having at least 70% isotactic pentads according to analysis by 13C-NMR. "Highly isotactic polypropylene" is defined as having at least 90% isotactic pentads according to analysis by 13C-NMR. "Syndiotactic polypropylene" is defined as polypropylene having at least 70% syndiotactic pentads according to analysis by 13C-NMR. Preferably, the macromers of the present invention are highly isotactic polypropylene.

The polypropylene macromers can have narrow or broad molecular weight distribution (Mw/Mn), for example, from 1.5 to 5, typically 1.7 to 3. Optionally, mixtures of sidechains with different molecular weights may be used.

The number-average molecular weight ($M_n$) of the polypropylene macromers of the present invention typically ranges from greater than or equal to 2,000 Daltons to less than about 50,000 Daltons, preferably less than 40,000 Daltons, more preferably less than 30,000 Daltons, most preferably less than or equal to 20,000 Daltons. Preferably, the $M_n$ of the polypropylene macromers of the present invention is greater than or equal to 5,000 Daltons, more preferably greater than or equal to 7,500 Daltons, most preferably greater than or equal to 10,000 Daltons. The number of sidechains is related to the $M_n$ of the sidechains such that the total weight fraction of the polymeric backbone segments between and outside the incorporated sidechains is greater than 0.40, preferably greater than 0.5–0.6. Weight here is determined by gel permeation chromatography (GPC) and differential refractive index (DRI) measurements Preferably, the macromers of the present invention are made using solution-phase conditions. Preferred solvents for solution phase reactions are selected on the basis of polymer solubility, volatility and safety/health considerations. Non-polar alkanes or aromatics are preferred. More preferably, the solvent is aromatic. Most preferably, the solvent is toluene.

The Polyolefin Backbone

The polyolefin backbone of the present invention is composed of propylene monomers and, optionally, one or more comonomers. In one embodiment of the present invention, no comonomers are present in the polyolefin backbone, resulting in a polymer having an isotactic polypropylene backbone and stereospecific polypropylene sidechains. Preferably, the sidechains are isotactic polypropylene.

In another embodiment of the present invention, one or more comonomers are present in the backbone. Comonomers which are useful in the present invention include ethylene, $C_4$–$C_{20}$ α-olefins, and lower carbon number ($C_3$–$C_8$) alkyl substituted analogs of the cyclic and styrenic olefins. Other copolymerizable monomers include geminally disubstituted olefins such as isobutylene, $C_5$–$C_{25}$ cyclic olefins such as cyclopentene, norbornene and alkyl-substituted norbornenes, and styrenic monomers such as styrene and alkyl substituted styrenes. Comonomers are selected for use based on the desired properties of the polymer product and the metallocene employed will be selected for its ability to incorporate the desired amount of olefins.

When comonomers are used, they preferably comprise from 3 to 20 mole percent of the branched polyolefin composition. More preferably, the comonomers comprise from 5 to 17 mole percent of the branched polyolefin composition.

In another embodiment of the present invention, the backbone of the present invention contains syndiotactic polypropylene and, optionally, one or more comonomers. Essentially all of the backbone can be syndiotactic, resulting in a polymer having a syndiotactic polypropylene backbone and stereospecific polypropylene sidechains. Alternatively, the backbone can be a combination of syndiotactic and isotactic polypropylene with, optionally, one or more comonomers.

An unusual feature of the branched polyolefin of the present invention is the presence of a significant amount of branching in the lower molecular weight range of the polymer. This branching results in improved melt strength, as well as other unique physical properties. In this case, the amount of branching is determined using the weight average branching index g' of the branched polyolefin. The weight average branching index g' is defined as $g=[IV]_{br}/[IV]_{lin|Mw}$.
It is well known in the art that as the g' value decreases, branching increases. See B. H. Zimm and W. H. Stockmayer, J. Chem. Phys. 17, 1301 (1949).

Preferably, the weight average branching index g' for the lower molecular weight region of the branched polyolefin of the present invention is less than 0.93. More preferably, the weight average branching index g' for the lower molecular weight region of the branched polyolefin of the present invention is less than 0.90. Most preferably, the weight average branching index g' for the lower molecular weight region of the branched polyolefin of the present invention is less than 0.88.

With regard to the molecular weight distribution of the polyolefin composition of the present invention, the following definitions apply:

Lower molecular weight region: That portion of the polymer product which has a molecular weight which is less than the number average molecular weight of the total polymer product.

Higher molecular weight region: That portion of the polymer product which has a molecular weight which is more than the number average molecular weight of the total polymer product.

The mass of the backbone will typically comprise at least 40 wt % of the total polymer mass, that of the backbone and the sidechains together, so the backbone typically will have a nominal weight-average molecular weight ($M_w$) weight of at least equal to or greater than about 100,000. The term nominal is used to indicate that direct measurement of $M_w$ of the backbone is largely impossible but that characterization of the copolymer product will exhibit measurements of $M_w$ that correlate to a close approximate weight of the polymeric backbone inclusive only of the monoolefin mer derivatives and the insertion moieties of the sidebranches.

Catalysts

Catalysts which are useful for producing the branched polyolefin of the present invention include all catalysts which are capable of producing isotactic polypropylene and incorporating significant quantities of the isotactic polypropylene macromers of the present invention. Preferably, metallocene catalysts are used.

As used herein "metallocene" refers generally to compounds represented by the formula $Cp_mMR_nX_q$ wherein Cp is a cyclopentadienyl ring which may be substituted, or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods for making and using metallocenes are well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,057,475; 5,120,867; 5,278,119; 5,304,614; 5,324,800; 5,350,723; and 5,391,790 each fully incorporated herein by reference.

Preferred metallocenes are those that are stereorigid and comprise a Group 4, 5, or 6 transition metal, biscyclopentadienyl derivative, preferably bis-indenyl metallocene components having the following general structure:

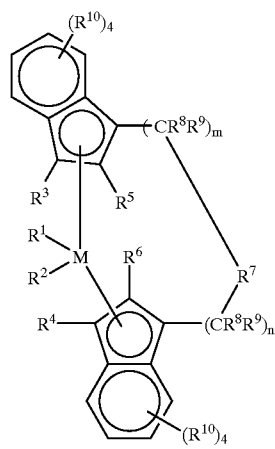

wherein $M^1$ is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconium and hafnium;

$R^1$ and $R^2$ are identical or different, are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a hydrogen atom, halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$ -arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

$R^7$ is

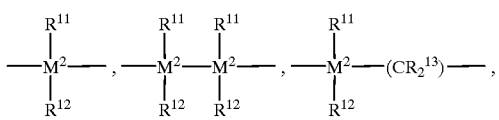

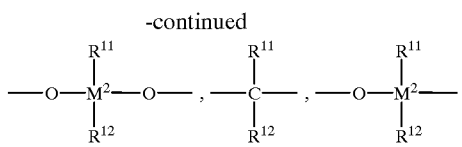

$=BR^{11}$, $=AlR^{11}$, $—Ge—$, $—Sn—$, $—O—$, $—S—$, $=SO$, $=SO_2$, $=NR^{11}$, $=CO$, $PR^{11}$, or $=P(O)R^{11}$;

wherein:

$R_1$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) is fluorine, chlorine, bromine or iodine atoms, preferably fluorine or chlorine.

Particularly preferred metallocenes are compounds of the structures:

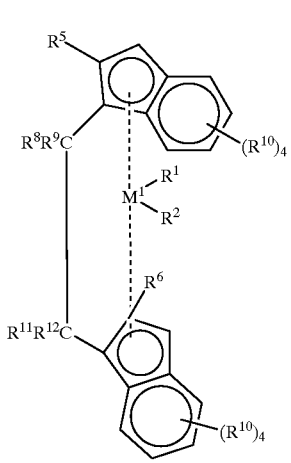
(A)

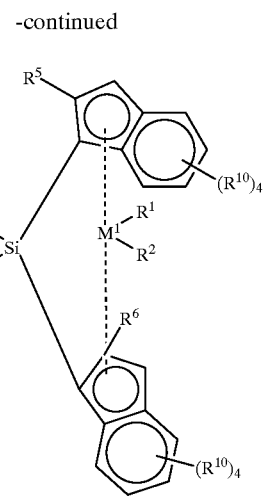
(B)

wherein:

$M^1$ is Zr or Hf, $R^1$ and $R^2$ are methyl or chlorine, and $R^5$, $R^6$ $R^8$, $R^9$, $R^{10}$, $R^{11}$ and $R^{12}$ have the above-mentioned meanings.

The chiral metallocenes may be used as a racemate for the preparation of highly isotactic polypropylene polymers and copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

Generally, the metallocenes are prepared by a multi-step process involving repeated deprotonations/metallations of the aromatic ligands and introduction of the bridge and the central atom by their halogen derivatives. The following reaction scheme illustrates this generic approach:

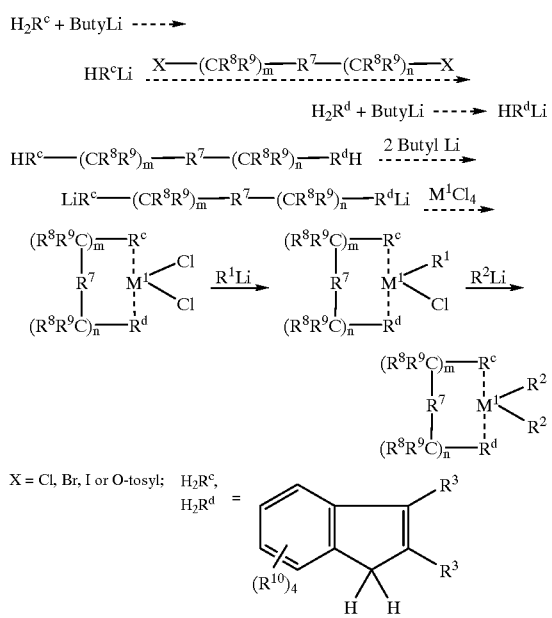

Additional methods for preparing metallocenes of the present invention are fully described in the *Journal of*

*Organometallic Chem.*, volume 288, (1958), pages 63–67, and in EP-A- 320762, for preparation of the metallocenes described, both of which are herein fully incorporated by reference.

Illustrative but non-limiting examples of some preferred metallocenes include:

Dimethylsilandiylbis (2-methyl-4-phenyl-1-indenyl)$ZrCl_2$
Dimethylsilandiylbis(2-methyl4,5-benzoindenyl)$ZrCl_2$;
Dimethylsilandiylbis(2-methyl4,6-diisopropylindenyl) $ZrCl_2$;
Dimethylsilandiylbis(2-ethyl-4-phenyl-1-indenyl)$ZrCl_2$;
Dimethylsilandiylbis (2-ethyl-4-naphthyl-1-indenyl)$ZrCl_2$,
Phenyl(Methyl)silandiylbis(2-methyl-4-phenyl-1-indenyl) $ZrCl_2$;
Dimethylsilandiylbis(2-methyl-4-(1-naphthyl)-1-indenyl) $ZrCl_2$;
Dimethylsilandiylbis(2-methyl-4(2-naphthyl)-1-indenyl) $ZrCl_2$,
Dimethylsilandiylbis(2-methyl-indenyl)$ZrCl_2$,
Dimethylsilandiylbis(2-methyl4,5-diisopropyl-1-indenyl) $ZrCl_2$,
Dimethylsilandiylbis(2,4,6-trimethyl-1-indenyl)$ZrCl_2$,
Phenyl(Methyl)silandiylbis(2-methyl4,6-diisopropyl-1-indenyl)$ZrCl_2$,
1,2-Ethandiylbis(2-methyl-4,6-diisopropyl-1-indenyl) $ZrCl_2$,
1,2-Butandiylbis(2-methyl-4,6-diisopropyl-1-indenyl) $ZrCl_2$,
Dimethylsilandiylbis(2-methyl-4-ethyl- -indenyl)$ZrCl_2$,
Dimethylsilandiylbis(2-methyl-4-isopropyl-1-indenyl) $ZrCl_2$,
Dimethylsilandiylbis(2-methyl4-t-butyl-1-indenyl)$ZrCl_2$,
Phenyl(Methyl)silandiylbis(2-methyl-4-isopropyl-1-indenyl)$ZrCl_2$,
Dimethylsilandiylbis(2-ethyl4-methyl-1-indenyl)$ZrCl_2$,
Dimethylsilandiylbis(2,4-dimethyl-1-indenyl)$ZrCl_2$,
Dimethylsilandiylbis(2-methyl4-ethyl-1-indenyl)$ZrCl_2$,
Dimethylsilandiylbis(2-methyl-α-acenaphth-1-indenyl) $ZrCl_2$,
Phenyl(Methyl)silandiylbis(2-methyl-4,5-benzo-1-indenyl) $ZrCl_2$,
Phenyl(Methyl)silandiylbis(2-methyl-4,5-(methylbenzo)-1-indenyl)$ZrCl_2$,
Phenyl(Methyl)silandiylbis(2-methyl-4,5-(tetramethylbenzo)-1-indenyl)$ZrCl_2$,
Phenyl(Methyl)silandiylbis (2-methyl-a-acenaphth-1-indenyl)$ZrCl_2$,
1,2-Ethandiylbis(2-methyl-4,5-benzo-1-indenyl)$ZrCl_2$,
1,2-Butandiylbis(2-methyl-4,5-benzo-1-indenyl)$ZrCl_2$,
Dimethylsilandiylbis(2-methyl-4,5-benzo-1-indenyl)$ZrCl_2$,
1,2-Ethandiylbis(2,4,7-trimethyl-1-indenyl)$ZrCl_2$,
Dimethylsilandiylbis(2-methyl-1-indenyl)$ZrCl_2$,
1,2-Ethandiylbis(2-methyl-1-indenyl)$ZrCl_2$,
Phenyl(Methyl)silandiylbis(2-methyl-1-indenyl)$ZrCl_2$,
Diphenylsilandiylbis(2-methyl-1-indenyl)$ZrCl_2$,
1,2-Butandiylbis(2-methyl-1-indenyl)$ZrCl_2$,
Dimethylsilandiylbis(2-ethyl-1-indenyl)$ZrCl_2$,
Dimethylsilandiylbis(2-methyl-5-isobutyl-1-indenyl)$ZrCl_2$,
Phenyl(Methyl)silandiylbis(2-methyl-5-isobutyl-1-indenyl) $ZrCl_2$,
Dimethylsilandiylbis(2-methyl-5-t-butyl-1-indenyl)$ZrCl_2$,
Dimethylsilandiylbis(2,5,6-trimethyl-1-indenyl)$ZrCl_2$, and the like.

Some preferred metallocene catalyst components are described in detail in U.S. Pat. Nos. 5,149,819, 5,243,001, 5,239,022, 5,296,434 and 5,276,208 all of which are herein fully incorporated by reference. In addition, the bis-amido and bis-arylamido transition metal catalysts of U.S. Pat. No. 5,318,935 and copending U.S. patent application Ser. No. 08/803,687, filed Feb. 24, 1997, and the α-diimine nickel catalyst complexes of WO 96/23010 can be useful in incorporating the macromers of the present invention into the backbone.

Most preferably, the catalyst used to produce the branched polyolefin of the present invention is a dimethylsilyl-bridged bis-indenyl zirconocene or hafnocene such as dimethylsilyl bis(2-methyl-indenyl) $ZrCl_2$, dimethylsilyl bis(2-methyl-4-phenyl-1-indenyl) $ZrCl_2$, dimethylsilyl bis(2-methyl-4-(1-naphthyl)-1-indenyl) $ZrCl_2$, or dimethylsilyl bis(indenyl) hafnium dimethyl.

Preferably, the catalysts used to produce the syndiotactic polypropylene backbone of the present invention are those disclosed in U.S. Pat. Nos. 4,892,851, 5,155,080, and 5,132,381, the disclosures of which are hereby incorporated by reference.

The terms "cocatalyst" and "activator" are used herein interchangeably and are defined to be any compound or component which can activate a bulky ligand transition metal compound or a metallocene, as defined above. Alumoxane may be used as an activator. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each of which is fully incorporated herein by reference. It may be preferable to use a visually clear methylalumoxane. A cloudy or gelled alumoxane can be filtered to produce a clear solution or clear alumoxane can be decanted from the cloudy solution.

It is also within the scope of this invention to use ionizing activators, neutral or ionic, or compounds such as tri(n-butyl)ammonium tetrakis(pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators are also contemplated by the invention, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing the both the active metallocene cation and an noncoordinating anion is also known. See, EP-A-0 426 637 and EP-A- 0 573 403 (incorporated herein by reference). An additional method of making the ionic catalysts uses ionizing anion pre-cursors which are initially neutral Lewis acids but form the cation and anion upon ionizing reaction with the metallocene compounds, for example the use of tris(pentafluorophenyl) boron. See EP-A-0 520 732 (incorporated herein by reference). Ionic catalysts for addition polymerization can also be prepared by oxidation of the metal centers of transition metal compounds by anion pre-cursors containing metallic oxidizing groups along with the anion groups, see EP-A-0 495 375 (incorporated herein by reference).

Where the metal ligands include halogen moieties (for example, biscyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for in situ processes describing the reaction of allyl aluminum compounds with dihalo-substituted metallocene compounds prior to or with the addition of activating anionic compounds.

Support Materials

The metallocenes described herein are preferably supported using a porous particulate material, such as for example, talc, inorganic oxides, inorganic chlorides and resinous materials such as polyolefin or polymeric compounds.

The most preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Preferably the support material is porous silica which has a surface area in the range of from about 10 to about 700 $m^2/g$, a total pore volume in the range of from about 0.1 to about 4.0 cc/g and an average particle size in the range of from about 10 to about 500 $\mu$m. More preferably, the surface area is in the range of from about 50 to about 500 $m^2/g$, the pore volume is in the range of from about 0.5 to about 3.5 cc/g and the average particle size is in the range of from about 20 to about 200 $\mu$m. Most preferably the surface area is in the range of from about 100 to about 400 $m^2/g$, the pore volume is in the range of from about 0.8 to about 3.0 cc/g and the average particle size is in the range of from about 30 to about 100 $\mu$m. The average pore size of typical porous support materials is in the range of from about 10 to about 1000 Å. Preferably, a support material is used that has an average pore diameter of from about 50 to about 500 Å, and most preferably from about 75 to about 350 Å. It may be particularly desirable to dehydrate the silica at a temperature of from about 100° C. to about 800° C. anywhere from about 3 to about 24 hours.

The metallocenes, activator and support material may be combined in any number of ways. Suitable support techniques are described in U.S. Pat. Nos. 4,808,561 and 4,701,432 (each fully incorporated herein by reference.). Preferably the metallocenes and activator are combined and their reaction product supported on the porous support material as described in U. S. Pat. No. 5,240,894 and WO 94/28034, WO 96/00243, and WO 96/00245 (each fully incorporated herein by reference.) Alternatively, the metallocenes may be preactivated separately and then combined with the support material either separately or together. If the metallocenes are separately supported, then preferably, they are dried then combined as a powder before use in polymerization.

Regardless of whether the metallocene and activator are separately precontacted or whether the metallocene and activator are combined at once, the total volume of reaction solution applied to porous support is preferably less than about 4 times the total pore volume of the porous support, more preferably less than about 3 times the total pore volume of the porous support and even more preferably in the range of from more than about 1 to less than about 2.5 times the total pore volume of the porous support. Procedures for measuring the total pore volume of porous support are well known in the art. The preferred method is described in Volume 1, *Experimental Methods in Catalyst Research*, Academic Press, 1968, pages 67–96.

Methods of supporting ionic catalysts comprising metallocene cations and noncoordinating anions are described in WO 91/09882, WO 94/03506, WO 96/04319 and U.S. Pat. No. 5,643,847 (incorporated herein by reference). The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. For details regarding prepolymerization, see U.S. Pat. Nos. 4,923,833 and 4,921,825, EP 0 279 863 and EP 0 354 893 each of which is fully incorporated herein by reference.

Polymerization Processes

The branched polyolefin of the present invention may be produced using the catalysts described above in any process including gas, slurry or solution phase or high pressure autoclave processes. (As used herein, unless differentiated, "polymerization" includes copolymerization and "monomer" includes comonomer.) Additionally, combinations of the above reactor types in multiple, series reactors and/or multiple reaction conditions and/or multiple catalyst configurations are explicitly intended. Preferably, a gas or slurry phase process is used, most preferably a bulk liquid propylene polymerization process is used.

In the preferred embodiment, this invention is directed toward the bulk liquid polymerization and copolymerization of propylene in a slurry or gas phase polymerization process, particularly a slurry polymerization process. Another embodiment involves copolymerization reactions of propylene with one or more comonomers. Such comonomers include alpha-olefin monomers having from 4 to 20 carbon atoms, preferably 4–12 carbon atoms, for example alpha-olefin comonomers of ethylene, butene-1, pentene-1, 4-methylpentene-1, hexene-1, octene-1, decene-1. Other suitable comonomers include geminally disubstituted monomers, $C_5$–$C_{25}$ cyclic olefins such as cyclopentene or norbornene, styrenic olefins such as styrene, and lower carbon number ($C_3$–$C_8$) alkyl substituted analogs of the cyclic and styrenic olefins. In addition, comonomers such as polar vinyl, diolefins such as dienes, for example, 1,3- butadiene, 1,4-hexadiene, norbornadiene or vinylnorbornene, acetylene and aldehyde monomers are suitable.

Typically in a gas phase polymerization process a continuous cycle is employed wherein one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. (See for example U.S. Pat. Nos. 4,543,399; 4,588,790; 5,028,670; 5,352,749; 5,405,922, and 5,436,304 all of which are fully incorporated herein by reference.)

A slurry polymerization process generally uses pressures in the range of from about 1 to about 500 atmospheres or even greater and temperatures in the range of from –60° C. to about 280° C. In a slurry polymerization, a suspension of solid, particulate polymer is formed in a liquid or supercritical polymerization medium to which propylene and comonomers and often hydrogen along with catalyst are added. The liquid employed in the polymerization medium can be, for example, an alkane or a cycloalkane. The medium employed should be liquid under the conditions of polymerization and relatively inert such as hexane and isobutane. In the preferred embodiment, propylene serves as the polymerization diluent and the polymerization is carried out using a pressure of from about 200 kPa to about 7,000 kPa at a temperature in the range of from about 50° C. to about 120° C.

The periods of time for each stage will depend upon the catalyst system, comonomer and reaction conditions. In general, propylene should be homopolymerized for a time period sufficient to yield a composition having from about 10 to about 90 weight percent homopolymer based on the total weight of the polymer, preferably from about 20 to about 80 weight percent, even more preferably from about 30 to about 70 homopolymer weight percent based on the total weight of the polymer.

The above-described temperatures, reaction times and other conditions are considered suitable polypropylene polymerization conditions for the purposes of this invention.

The polymerization may be conducted in batch or continuous mode and the entire polymerization may take place in one reactor or, preferably, the polymerization may be carried out in a series of reactors. If reactors in series are used, then the comonomer may be added to any reactor in the series, however, preferably, the comonomer is added to the second or subsequent reactor.

Hydrogen may be added to the polymerization system as a molecular weight regulator in the first and/or subsequent reactors depending upon the particular properties of the product desired and the specific metallocenes used. When metallocenes having different hydrogen responses are used, the addition of hydrogen will affect the molecular weight distribution of the polymer product accordingly. A preferred product form is to have the comonomer be present in the high molecular weight species of the total polymer composition to provide a favorable balance of good film stretchability without breaking, coupled with low extractables, low haze and good moisture barrier in the film. Accordingly in this preferred case, the same or lower levels of hydrogen are utilized during copolymerization as were used during polymerization in the second or subsequent reactor.

For both polypropylene macromer product and branched polyolefin preparation, it is known that many methods and permutations of the ordering of addition of macromer and monomer species to the reactor are possible, some more advantageous than others. For example, it is widely known in the art that preactivation of the metallocene with alumoxane before addition to a continuous solution-phase reactor yields higher activities than continuous addition of metallocene and activator in two separate streams. Furthermore, it may be advantageous to control precontacting time to maximize catalyst effectiveness, e.g., avoiding excessive aging of the activated catalyst composition.

It is preferable to use the isotactic polypropylene macromers such that they are promptly functionalized or copolymerized after being prepared. The highly reactive vinyl groups appear to be susceptible to by-product reactions with adventitious impurities and, even, dimerization or addition reactions with other unsaturated group-containing polymeric chains. Thus maintaining in a cooled, inert environment after preparation and prompt subsequent use will optimize the effectiveness of the use of the polypropylene macromer product. A continuous process utilizing series reactors, or parallel reactors will thus be effective, the polypropylene macromer product being prepared in one and continuously introduced into the other.

Industrial Utility

The branched polyolefin polymers of the present invention exhibit improved melt strength and shear thinning characteristics to standard propylene copolymers. This results in improved processability of the polymers, e.g. increased shear thinning and high output for a constant energy input. These characteristics will result in improved processing in blow molding and thermoforming operations. For example, in thermoforming operations sag will be decreased and power consumption will be lowered in the extruders.

In order that the invention may be more readily understood, reference is made to the following examples, which are intended to illustrate the invention but not to limit the scope thereof

EXAMPLES

General

All polymerizations were performed in a 2-liter Zipperclave reactor equipped with a water jacket for temperature control. Liquids were measured into the reactor using calibrated sight glasses. High purity (>99.5%) toluene was purified by passing first through basic alumina activated at high temperature in nitrogen, followed by molecular sieve activated at high temperature in nitrogen. Propylene was purified by passing through activated basic alumina and molecular sieves. Methylalumoxane (MAO, 10% in toluene) was received from Albemarle Inc. in stainless steel cylinders, divided into 1-liter glass containers, and stored in a laboratory glove-box at ambient temperature.

Propylene was measured into the reactor through a calibrated container. To ensure the reaction medium was well-mixed, a flat-paddle stirrer rotating at 750 rpm was used.

Reactor Preparation

The reactor was first cleaned by heating to 150° C. in toluene to dissolve any polymer residues, then cooled and drained. Next, the reactor was heated using jacket water at 110° C. and the reactor was purged with flowing nitrogen for a period of ~30 minutes. Before reaction, the reactor was further purged using 3 nitrogen pressurize/vent cycles (to 100 psi). The cycling served two purposes: (1) to thoroughly penetrate all dead ends such as pressure gauges to purge fugitive contaminants and (2) to pressure test the reactor.

Catalysts

All catalyst preparations were performed in an inert atmosphere with <1.5 ppm $H_2O$ content. The catalyst systems used in the synthesis of macromer was dimethylsilyl bis(2-methyl-4-phenylindenyl) zirconium dichloride. The dimethylsilyl bis(2-methyl4-phenylindenyl) zirconium dichloride was activated with MAO. To maximize solubility of the metallocene, toluene was used as a solvent. The catalyst as added to a stainless steel tube by pipette and transferred to the reactor.

Example 1

The synthesis of polypropylene macromer was conducted in a 2-liter autoclave reactor. The reactor was charged with toluene (1 L), propylene (150 mL), and triisobutylaluminum (2.0 mL of 1M solution in toluene). The reactor was heated to 105° C. and equilibrated for 5 min. Then 2 mg of dimethylsilyl bis(2-methyl-4-phenylindenyl) zirconium dichloride and 1 mL of MAO (10 wt % in toluene) were injected using a catalyst tube. After 15 min, the reactor was cooled to 25° C. and vented. Methanol (500 mL) was added to the polymer solution to precipitate the polymer. The polymer was collected by filtration, and dried in a vacuum oven for 12 hours. The polymer product had an Mn of 13,000 and a molecular weight distribution of 1.92.

Example 2

A 2-liter reactor was charged with toluene (1 L), propylene (150 mL), 10 g of the polypropylene macromer from Example 1 and Triisobutylaluminum (2.0 mL of 1M solution in toluene). The reactor was heated to 55° C. and equilibrated for 5 min. Then 2 mg of dimethylsilyl bis(2-methyl-4-phenylindenyl) zirconium dichloride activated in 5 mL of toluene and 1 mL of MAO (10 wt % in toluene) was injected using a catalyst tube. After 15 min, the reactor was cooled to 25° C. and vented. The polymer was collected by filtration and dried in a vacuum oven (80° C.) for 12 hours. Yield: 77 g.

Example 3

A 2-liter autoclave reactor was charged with toluene (1 L), propylene (150 mL), 20 g of the polypropylene macromer from Example 1 and Triisobutylaluminum (2.0 mL of 1M solution in toluene). The reactor was heated to 55° C. and equilibrated for 5 min. Then 2 mg of dimethylsilyl bis(2-methyl4-phenylindenyl) zirconium dichloride activated in 5 mL of toluene and 1 mL of MAO (10 wt % in toluene) was injected using a catalyst tube. After 15 min. the reactor was cooled to 25° C. and vented. The polymer was collected by filtration and dried in a vacuum oven (80° C.) for 12 hours. Yield: 86 g.

Comparative Example 4

A 2-liter reactor was charged with toluene (1 L), propylene (150 mL), and Triisobutylaluminum (2.0 mL of 1M solution in toluene). The reactor was heated to 55° C. and equilibrated for 5 min. Then 2 mg of dimethylsilyl bis(2-methyl-4-phenylindenyl) zirconium dichloride activated in 5 mL of toluene and 1 mL of MAO (10 wt % in toluene) was injected using a catalyst tube. After 15 min, the reactor was cooled to 25° C. and vented. The polymer was collected by filtration and dried in a vacuum oven (80° C.) for 12 hours. Yield: 71 g.

Product Characterization

Some general characterization data for the polymers made in the Examples 2, 3 and Comparative Example 4 are listed in Table 1. The polymer product samples were analyzed by gel permeation chromatography using a Waters 150C high temperature system equipped with a DRI Detector, Showdex AT-806MS column and operating at a system temperature of 145° C. The solvent used was 1,2,4-trichlorobenzene, from which polymer sample solutions of 1.5 mg/ml concentration were prepared for injection. The total solvent flow rate was 1 ml/minute and the injection size was 300 microliters. After elution of the polymer samples, the resulting chromatograms were analyzed using the Waters Expert Fuse program to calculate the molecular weight distribution and one or more of $M_n$, $M_w$, and $M_z$ averages. The melting point of the polymer product samples was determined on a DSC 2910 Differential Scanning Calorimeter (TA Instruments). The reported melting points were recorded at second melt with a temperature ramp of 2–10° C./min. The percentage of polypropylene macromer in the polymer samples was calculated by mass balance.

TABLE 1

GPC Molecular Weight and Number Summary

| Example | Mn | Mw | MWD | Tm (° C.) | % Macromer |
|---------|--------|---------|------|-----------|------------|
| 2 | 50,195 | 218,372 | 4.35 | 156.7 | 6.5 |
| 3 | 46,233 | 248,922 | 5.38 | 154.5 | 11.5 |
| Comp. 4 | 61,350 | 262,234 | 4.27 | 158.7 | 0 |

Figure 2:
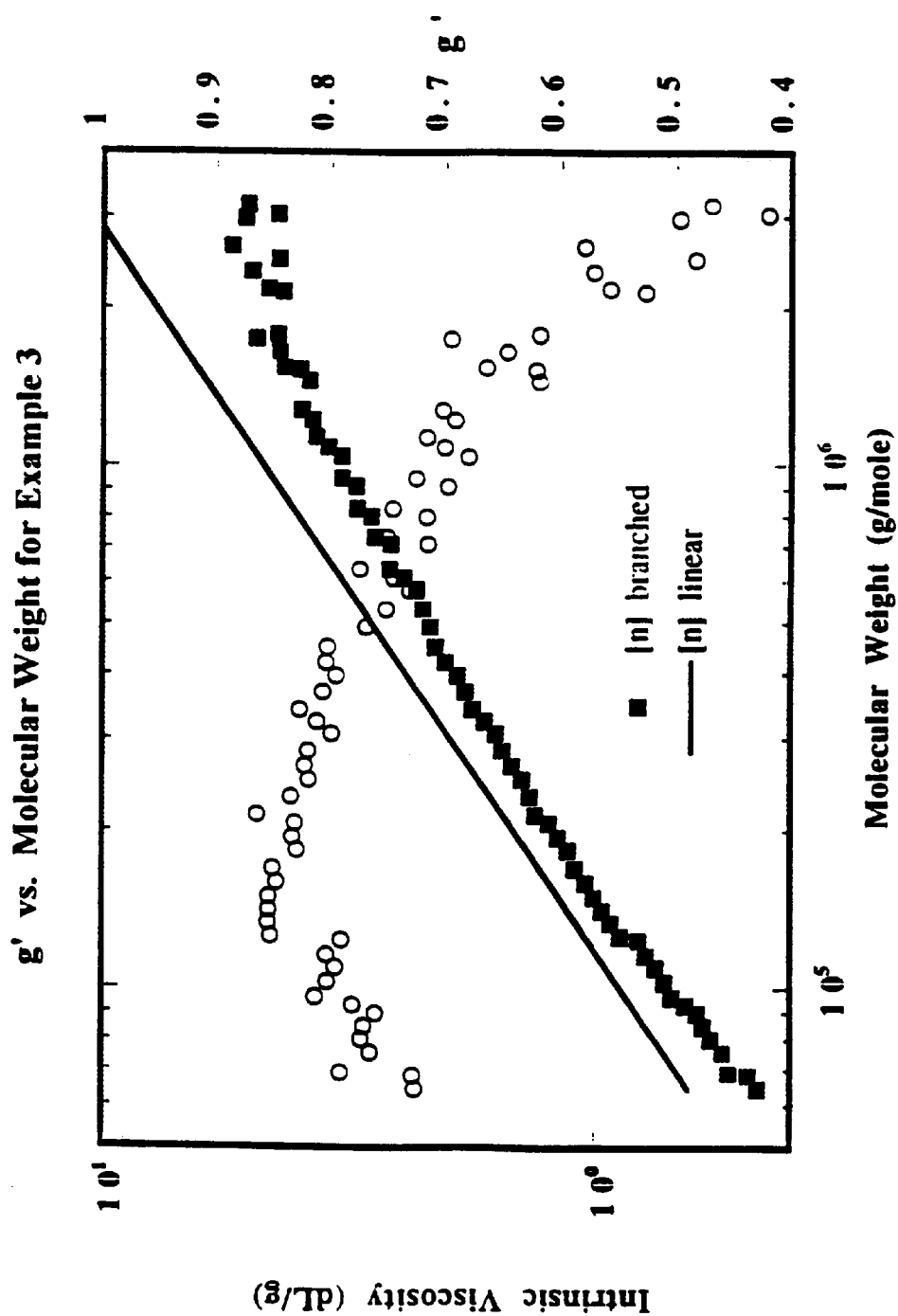
FIG. 2 is a graphic illustration of the relationship between the weight average branching index g' and the molecular weight for the polymer product produced in Example 3.
Figure 3:
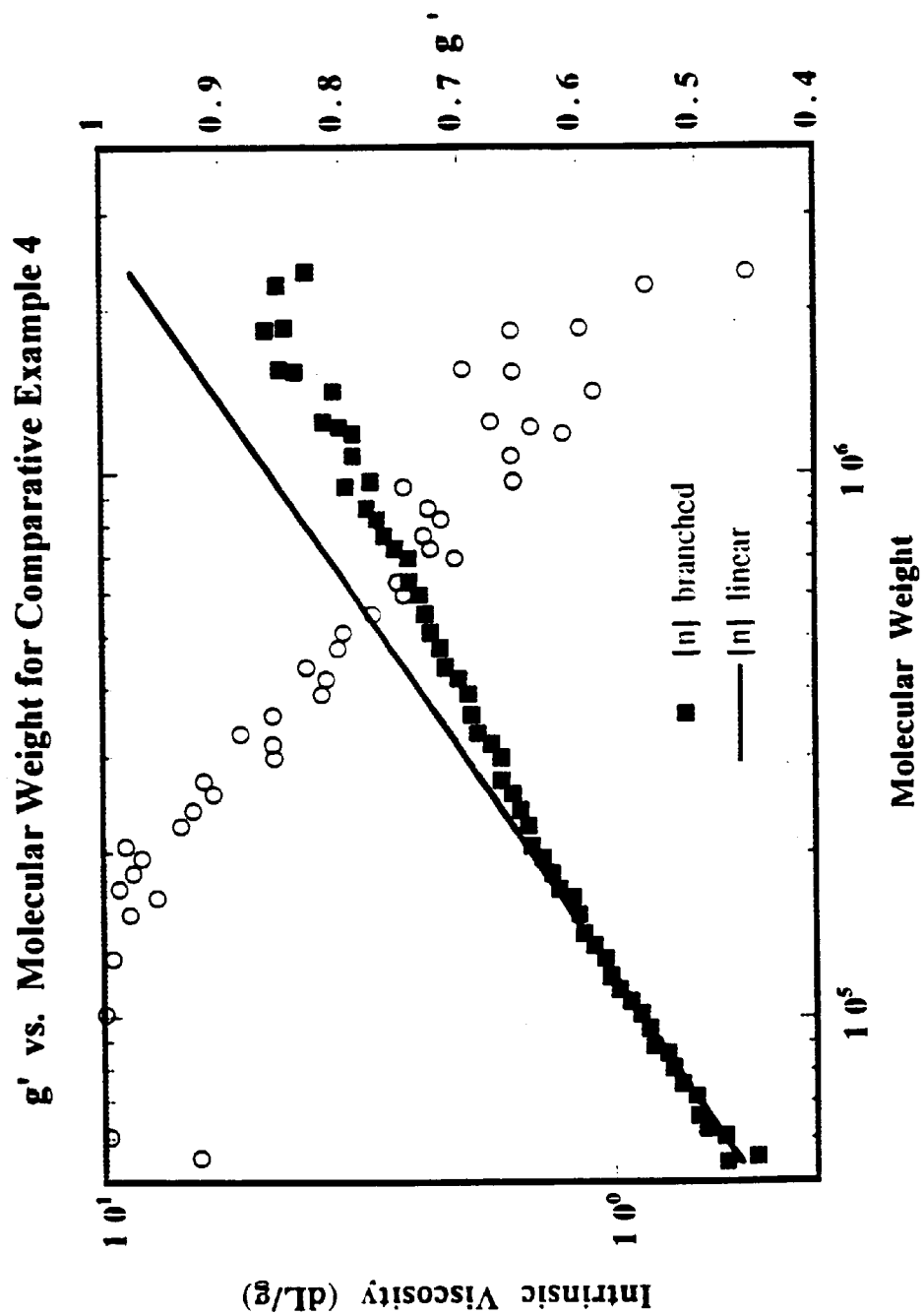
FIG. 3 is a graphic illustration of the relationship between the weight average branching index g' and the molecular weight for the polymer product produced in Comparative Example 4.

GPC/viscosity analysis was used to measure the incorporation of polypropylene macromer and the branch level in the polymer products of Examples 2, 3 and Comparative Example 4. The molecular weight of the polymers was measured by a Waters 150-C ALC/GPC and the intrinsic viscosity of the polymers in 1,2,4-trichlorobenzene was measured at each molecular weight in the GPC trace using a on-line differential viscometer at 135° C. The weight average branching index g' is defined as $g'=[IV]_{br}/[IV]_{lin|Mw}$. As shown in FIGS. 1 and 2, the g' values of the polymers incorporating macromers are substantially below 1, indicating extensive branches in these polymers. FIG. 3, on the other hand, shows that the polymer produced without macromers has g' values around 1 in the lower molecular weight region. This indicates very little or no branching of the lower molecular weight portion of the polymer product.

Figure 4:
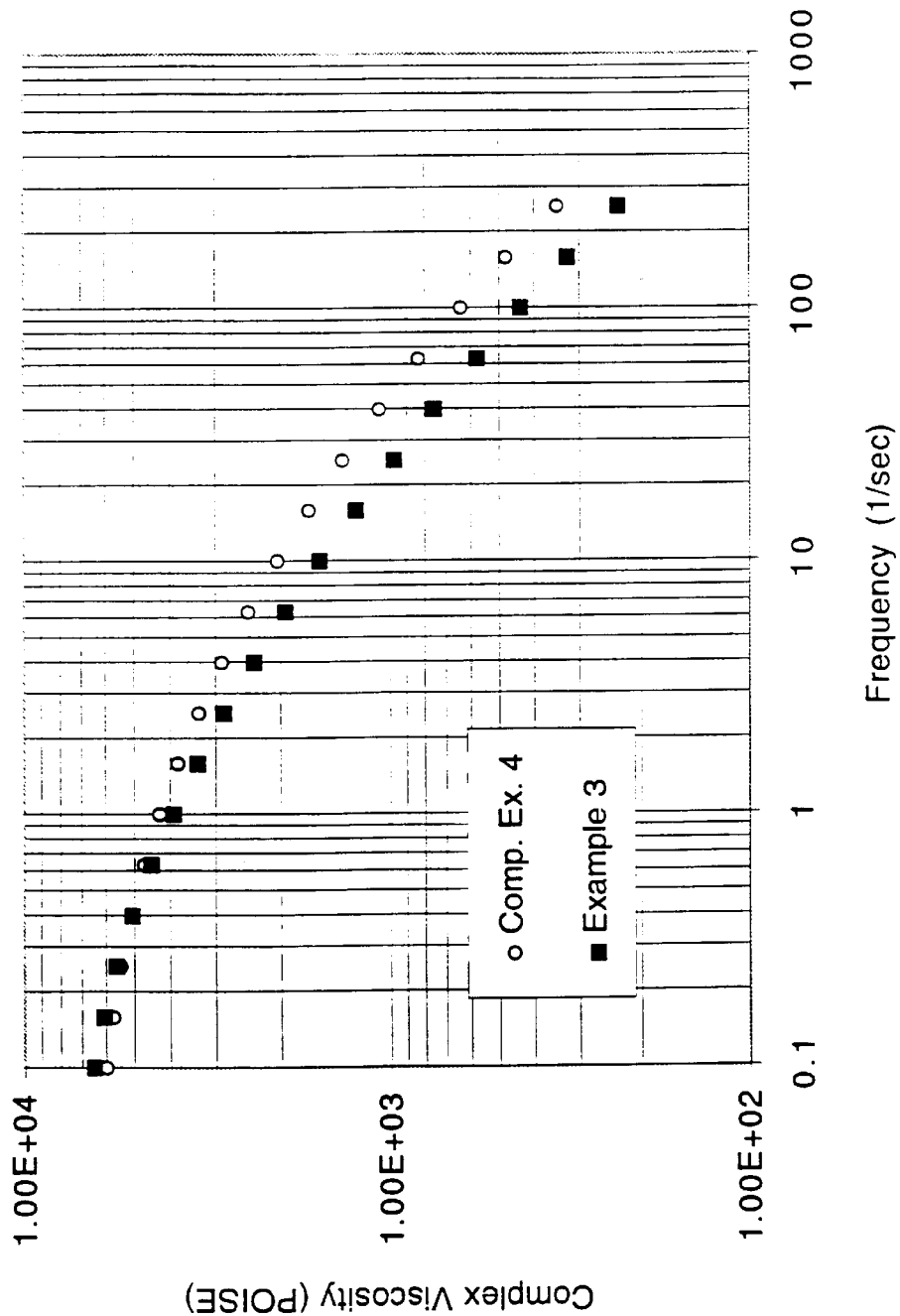
FIG. 4 is a graphic illustration of the complex viscosity vs. shear rate curve for the polymer products produced in Example 3 and Comparative Example 4.

FIG. 4 shows a complex viscosity vs. shear rate curve for the polymers produced in Example 3 and Comparative Example 4. Example 3 demonstrates a steeper curve than Comparative Example 4. A steeper curve correlates to improved shear thinning performance as the viscosity reduces more rapidly at high shear rates. Therefore, the polymer product which was produced using macromers demonstrates improved processability over a polymer which was produced without the use of macromers.

While certain representative embodiments and details have been shown for the purposes of illustrating the invention, it will be apparent to those skilled in the art that various changes in the process and products disclosed herein may be made without departing from the scope of the invention, which is defined in the appended claims.

We claim:

1. A polyolefin composition consisting essentially of isotactic polypropylene and, optionally, up to 20 mole percent comonomer repeating units formed from one or more comonomers selected from the group consisting of ethylene, butene-1, pentene-1, 4-methylpentene-1, hexene-1, octene-1, decene-1, geminally disubstituted olefins, $C_7$–$C_{25}$ cyclic olefins, styrenic olefins, lower carbon number ($C_3$–$C_8$) alkyl substituted analogs of the cyclic and styrenic olefins, polar vinyl compounds, 1,4-hexadiene, norbornadiene, and acetylene, said polyolefin composition having stereospecific crystalline polypropylene sidechains comprising isotactic or syndiotactic polypropylene wherein the polyolefin composition has a lower molecular weight region with a weight average branching index g' of less than 0.93.

2. The composition of claim 1 wherein the weight average branching index g' is less than 0.90.

3. The composition of claim 1 wherein no comonomer repeating units are present.

4. The composition of claim 1 consisting essentially of isotactic polypropylene and from 3 to 20 mole percent said comonomer repeating units.

5. The composition of claim 1 consisting essentially of isotactic polypropylene and from 5 to 17 mole percent said comonomer repeating units.

6. A polyolefin composition having a lower molecular weight region said polyolefin comprising:

a backbone consisting essentially of isotactic polypropylene and, optionally, up to 20 mole percent comonomer repeating units formed from one or more comonomers selected from the group consisting of ethylene, butene-1, pentene-1, 4-methylpentene-1, hexene-1, octene-1, decene-1, geminally disubstituted olefins, $C_7$–$C_{25}$ cyclic olefins, styrenic olefins, lower carbon number ($C_3$–$C_8$) alkyl substituted analogs of the cyclic and styrenic olefins, polar vinyl compounds, 1,4-hexadiene, norbornadiene, and acetylene;

stereospecific crystalline polypropylene sidechains comprising isotactic or syndiotactic polypropylene;

wherein the weight average branching index g' for the lower molecular weight region of said polyolefin composition is less than 0.93.

7. The polyolefin composition of claim 6 wherein the weight average branching index g' for the lower molecular weight region of said polyolefin composition is less than 0.90.

8. The polyolefin composition of claim 6 wherein the weight average branching index g' for the lower molecular weight region of said polyolefin composition is less than 0.88.

9. The polyolefin composition of claim 6 wherein the backbone consists essentially of isotactic polypropylene and from 5 to 17 mole percent said comonomer repeating units.

10. A polyolefin composition having a lower molecular weight region, said polyolefin consisting essentially of:

a backbone of stereospecific polypropylene and, optionally, from 3 to 20 mole percent comonomer repeating units formed from one or more comonomers selected from the group consisting of ethylene, butene-1, pentene-1, 4-methylpentene-1, hexene-1, octene-1, decene-1, geminally disubstituted olefins, $C_7$–$C_{25}$ cyclic olefins, styrenic olefins, lower carbon number ($C_3$–$C_8$) alkyl substituted analogs of the cyclic and styrenic olefins, polar vinyl compounds, 1,4-hexadiene, norbornadiene, and acetylene;

stereospecific crystalline polypropylene sidechains comprising isotactic or syndiotactic polypropylene;

wherein the weight average branching index g' for the lower molecular weight region of said polyolefin composition is less than 0.93.

11. The polyolefin composition of claim 10 wherein the weight average branching index g' for the lower molecular weight region of said polyolefin composition is less than 0.90.

12. The polyolefin composition of claim 10 wherein the weight average branching index g' for the lower molecular weight region of said polyolefin composition is less than 0.88.

13. The polyolefin composition of claim 10 wherein the backbone consists essentially of stereospecific polypropylene and from 5 to 17 mole percent said comonomer repeating units.

14. A polyolefin composition having a lower molecular weight region, said polyolefin comprising:

a backbone consisting essentially of stereospecific polypropylene and, optionally, from 5 to 17 mole percent comonomer repeating units formed from one or more comonomers selected from the group consisting of ethylene, butene-1, pentene-1, 4-methylpentene-1, hexene-1, octene-1, decene-1, seminally disubstituted olefins, $C_7$–$C_{25}$ cyclic olefins, styrenic olefins, lower carbon number ($C_3$–$C_8$) alkyl substituted analogs of the cyclic and styrenic olefins, polar vinyl compounds, 1,4-hexadiene, norbornadiene, and acetylene;

stereospecific crystalline polypropylene sidechains comprising isotactic or syndiotactic polypropylene;

and wherein the weight average branching index g' for the lower molecular weight region of said polyolefin composition is less than 0.93.

15. The polyolefin composition of claim 14 wherein the weight average branching index g' for the lower molecular weight region of said polyolefin composition is less than 0.90.

16. The polyolefin composition of claim 14 wherein the weight average branching index g' for the lower molecular weight region of said polyolefin composition is less than 0.88.

* * * * *